US012665789B2

(12) United States Patent
Tessier

(10) Patent No.: US 12,665,789 B2
(45) Date of Patent: Jun. 23, 2026

(54) METHOD AND APPARATUS FOR MULTI-USER MULTIPLE INPUT-MULTIPLE OUTPUT (MU-MIMO) COMPLEXITY REDUCTION FOR FREQUENCY DISPERSIVE CHANNELS

(71) Applicant: Telefonaktiebolaget LM Ericsson (publ), Stockholm (SE)

(72) Inventor: Stéphane Tessier, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 549 days.

(21) Appl. No.: 17/926,854

(22) PCT Filed: Jul. 14, 2020

(86) PCT No.: PCT/EP2020/069892
§ 371 (c)(1),
(2) Date: Nov. 21, 2022

(87) PCT Pub. No.: WO2021/233562
PCT Pub. Date: Nov. 25, 2021

(65) Prior Publication Data
US 2023/0198812 A1     Jun. 22, 2023

(30) Foreign Application Priority Data
May 22, 2020    (WO) ................ PCT/EP2020/064325

(51) Int. Cl.
H04L 25/02        (2006.01)
H04B 7/0452       (2017.01)
H04L 5/00         (2006.01)
(52) U.S. Cl.
CPC ....... H04L 25/0222 (2013.01); H04B 7/0452 (2013.01); H04L 5/0058 (2013.01)

(58) Field of Classification Search
CPC ..... H04L 25/0222; H04L 5/0058; H04L 5/02; H04B 7/0452
See application file for complete search history.

(56) References Cited

U.S. PATENT DOCUMENTS

2009/0154577 A1    6/2009  Lindoff et al.
2011/0053630 A1*   3/2011  Higuchi ................ H04L 5/0058
                                                455/509

(Continued)

FOREIGN PATENT DOCUMENTS

CN        103873414 A      6/2014
CN        105471773 A      4/2016

(Continued)

OTHER PUBLICATIONS

International Search Report and Written Opinion dated Apr. 8, 2021 for International Application No. PCT/EP2020/069892 filed Jul. 14, 2020; consisting of 13 pages.

(Continued)

*Primary Examiner* — Ian N Moore
*Assistant Examiner* — Latresa A McCallum
(74) *Attorney, Agent, or Firm* — Weisberg I.P. Law, P.A.

(57)        ABSTRACT

A method and apparatus are disclosed to reduce MU-MIMO complexity in a receiver. In one embodiment, a method implemented in a network node includes determining a frequency dispersion of a channel for a wireless device (WD); and based at least in part on the determination of the frequency dispersion, determining at least one frequency spacing for at least one weight associated with the channel. In another embodiment, a method implemented in a WD includes transmitting a signal to the network node; and receiving an allocation of at least one time-frequency resource based at least in part on a determination of a frequency dispersion on the transmitted signal, the at least (Continued)

BEGIN

Determine a frequency dispersion of a channel for the WD
S100

Based at least in part on the determination of the frequency dispersion, determine at least one frequency spacing for at least one weight associated with the channel
S102

END one time-frequency resource being shared between the WD and at least one other WD.

11 Claims, 5 Drawing Sheets

(56)                References Cited

U.S. PATENT DOCUMENTS

| | | | | |
|---|---|---|---|---|
| 2011/0111760 | A1* | 5/2011 | Bevan | H04W 72/121 |
| | | | | 455/67.11 |
| 2015/0063128 | A1* | 3/2015 | Garikipati | H04B 7/0452 |
| | | | | 370/252 |
| 2017/0230992 | A1* | 8/2017 | Patel | H04W 72/1268 |
| 2018/0205435 | A1* | 7/2018 | Nair | H04B 7/088 |
| 2018/0324661 | A1* | 11/2018 | Rydén | H04W 36/085 |
| 2018/0343669 | A1* | 11/2018 | Wang | H04W 74/0816 |
| 2019/0074890 | A1* | 3/2019 | Chang | H04L 5/0023 |
| 2019/0222273 | A1* | 7/2019 | Liu | H04L 5/003 |
| 2019/0312625 | A1 | 10/2019 | Liang et al. | |
| 2020/0374724 | A1* | 11/2020 | Sarajlic | H04B 7/063 |
| 2022/0311489 | A1* | 9/2022 | Rakib | H04B 7/0452 |

FOREIGN PATENT DOCUMENTS

| | | | |
|---|---|---|---|
| CN | 107251618 | A | 10/2017 |
| CN | 108282198 | A | 7/2018 |

OTHER PUBLICATIONS

Chinese Office Action and English Summary dated Feb. 22, 2025, for Application No. 202080102767.9, consisting of 6 pages.
Chinese Office Action and English machine translation dated Dec. 29, 2025; Application No. 1 202080102767.9; consisting of 16 pages.

* cited by examiner

Network Node 16

SW 40

HW 27

Communication interface 28

Radio interface 30

Processing circuitry 34

Memory 38

Processor 36

Measurement Unit 24

WD 22

SW 52

Client application 54

HW 42

Radio interface 44

Processing circuitry 46

Memory 50

Processor 48

Resource Unit 26

32

METHOD AND APPARATUS FOR MULTI-USER MULTIPLE INPUT-MULTIPLE OUTPUT (MU-MIMO) COMPLEXITY REDUCTION FOR FREQUENCY DISPERSIVE CHANNELS

CROSS-REFERENCE TO RELATED APPLICATIONS

This application is a Submission Under 35 U.S.C. § 371 for U.S. National Stage Patent Application of International Application No.: PCT/EP2020/069892, filed Jul. 14, 2020 entitled "METHOD AND APPARATUS FOR MU-MIMO," which claims priority to International Application No.: PCT/EP2020/064325, filed May 22, 2020, entitled "METHOD AND APPARATUS FOR MU-MIMO," the entireties of both of which are incorporated herein by reference.

TECHNICAL FIELD

The present disclosure relates to wireless communication and in particular, to a method and system for multiple user multiple-input multiple-output (MU-MIMO).

BACKGROUND

The advent of antenna arrays with many antenna elements opens the possibility of co-scheduling users sharing the same resources, separated only spatially. However, this implies that a huge amount of information needs to be considered in order to achieve this goal. The term "resource" here generally refers to a shared frequency band, used at the same time by several users.

Today, one criteria used to identify if a user is eligible for resource sharing is based on signal-to-interference-plus-noise ratio (SINR), with the assumption that good SINR generally means that the wireless device (WD), e.g., user equipment (UE), is close to the receiver and thus has a good chance to have a rather strong Line-Of-Sight (LOS) component. This leads to a lower delay spread. However, using SINR is a very rough estimation and leads to inaccurate assumptions about resource sharing capability.

SUMMARY

Some embodiments advantageously provide a method and system for multiple user multiple-input multiple-output (MU-MIMO) complexity reduction in a receiver.

According to one aspect of the present disclosure, a method implemented in a network node configured to communicate with a wireless device (WD) is provided. The method includes determining a frequency dispersion of a channel for the WD; and based at least in part on the determination of the frequency dispersion, determining at least one frequency spacing for at least one weight associated with the channel.

In some embodiments, the method further includes allocating at least one shared time-frequency resource to the WD and at least one other WD based at least in part on at least one of the determination of the frequency dispersion and the determined at least one frequency spacing. In some embodiments, the shared time-frequency resource is at least one of: an uplink resource; and a downlink resource. In some embodiments, the determining the frequency dispersion further comprises determining a channel estimate for the WD at each subcarrier within a frequency region. In some embodiments, subcarriers within the frequency region are represented by indices and the indices are integer values. In some embodiments, the frequency region is represented by an integer corresponding to a physical resource block index. In some embodiments, the determining the frequency dispersion comprises: determining a mean frequency dispersion value for a plurality of frequency dispersion measurements, the plurality of frequency dispersion measurements taken over at least one physical resource block and for one of at least one antenna stream and at least one beam stream.

In some embodiments, the one of the at least one antenna stream and the at least one beam stream used to determine the mean frequency dispersion value is selected based on whether the corresponding stream has a power that at least meets a predetermined threshold power value. In some embodiments, a number of the at least one physical resource block used to determine the mean frequency dispersion value is a predetermined number. In some embodiments, the method includes determining a threshold for the determination of the frequency dispersion; and using the determined threshold to determine a number of other WDs to co-schedule with the WD on a same time-frequency resource. In some embodiments, the method further includes applying the at least one weight to a time-frequency resource, the time-frequency resource being shared by the WD and at least one other spatially separate WD in multiple user multiple-input multiple-output, MU-MIMO, communication.

In some embodiments, the method further includes transmitting an indication of a timing adjustment value to the WD; and one of transmitting and receiving a signal on a shared time-frequency resource based at least in part on the timing adjustment value. In some embodiments, the method further includes receiving a signal from the WD. In some embodiments, the determining the frequency dispersion of the channel for the WD comprises performing a measurement of the frequency dispersion on the received signal.

According to another aspect of the present disclosure, a network node configured to communicate with a wireless device (WD) is provided. The network node includes processing circuitry. The processing circuitry is configured to cause the network node to determine a frequency dispersion of a channel for the WD; and based at least in part on the measurement, determine at least one frequency spacing for at least one weight associated with the channel.

In some embodiments, the processing circuitry is further configured to cause the network node to allocate at least one shared time-frequency resource to the WD and at least one other WD based at least in part on at least one of the determination of the frequency dispersion and the determined at least one frequency spacing. In some embodiments, the shared time-frequency resource is at least one of: an uplink resource; and a downlink resource. In some embodiments, the processing circuitry is configured to determine the frequency dispersion by being configured to cause the network node to determine a channel estimate for the WD at each subcarrier within a frequency region. In some embodiments, subcarriers within the frequency region are represented by indices and the indices are integer values. In some embodiments, the frequency region is represented by an integer corresponding to a physical resource block index. In some embodiments, the processing circuitry is configured to determine the frequency dispersion by being configured to cause the network node to determine a mean frequency dispersion value for a plurality of frequency dispersion measurements, the plurality of frequency dispersion measurements taken over at least one physical resource block and for one of at least one antenna stream and at least one beam stream.

In some embodiments, the one of the at least one antenna stream and the at least one beam stream used to determine the mean frequency dispersion value is selected based on whether the corresponding stream has a power that at least meets a predetermined threshold power value. In some embodiments, a number of the at least one physical resource block used to determine the mean frequency dispersion value is a predetermined number. In some embodiments, the processing circuitry is further configured to cause the network node to determine a threshold for the determination of the frequency dispersion; and use the determined threshold to determine a number of other WDs to co-schedule with the WD on a same time-frequency resource. In some embodiments, the processing circuitry is further configured to cause the network node to apply the at least one weight to a time-frequency resource, the time-frequency resource being shared by the WD and at least one other spatially separate WD in multiple user multiple-input multiple-output, MU-MIMO, communication.

In some embodiments, the processing circuitry is further configured to cause the network node to transmit an indication of a timing adjustment value to the WD; and one of transmit and receiving a signal on a shared time-frequency resource based at least in part on the timing adjustment value. In some embodiments, the processing circuitry is further configured to cause the network node to receive a signal from the WD; and determine the frequency dispersion of the channel for the WD by being configured to perform a measurement of the frequency dispersion on the received signal.

According to another aspect of the present disclosure, a method implemented in a wireless device (WD) configured to communicate with a network node is provided. The method includes transmitting a signal to the network node; and receiving an allocation of at least one time-frequency resource based at least in part on a determination of a frequency dispersion on the transmitted signal, the at least one time-frequency resource being shared between the WD and at least one other WD.

In some embodiments, the shared time-frequency resource is at least one of: an uplink resource; and a downlink resource. In some embodiments, a number of other WDs sharing the at least one time-frequency resource with the WD is based at least in part on the determination of the frequency dispersion. In some embodiments, the method further includes one of transmitting and receiving signalling on the allocated at least one time-frequency resource, at least one weight being applied to the signalling and the at least one weight being based at least in part on the determination of the frequency dispersion. In some embodiments, the method further includes receiving an indication of a timing adjustment value from the network node; and one of transmitting and receiving a signal on the allocated at least one time-frequency resource based at least in part on the timing adjustment value.

According to yet another aspect of the present disclosure, a wireless device (WD) configured to communicate with a network node is provided. The WD includes processing circuitry. The processing circuitry is configured to cause the WD to transmit a signal to the network node; and receive an allocation of at least one time-frequency resource based at least in part on a determination of a frequency dispersion on the transmitted signal, the at least one time-frequency resource being shared between the WD and at least one other WD.

In some embodiments, the shared time-frequency resource is at least one of: an uplink resource; and a downlink resource. In some embodiments, a number of other WDs sharing the at least one time-frequency resource with the WD is based at least in part on the determination of the frequency dispersion. In some embodiments, the processing circuitry is further configured to cause the WD to: one of transmit and receive signalling on the allocated at least one time-frequency resource, at least one weight being applied to the signalling and the at least one weight being based at least in part on the determination of the frequency dispersion. In some embodiments, the processing circuitry is further configured to cause the WD to receive an indication of a timing adjustment value from the network node; and one of transmit and receive a signal on the allocated at least one time-frequency resource based at least in part on the timing adjustment value.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
FIG. 1 is a schematic diagram of an example network architecture illustrating a communication system according to the principles in the present disclosure.
Figure 1:
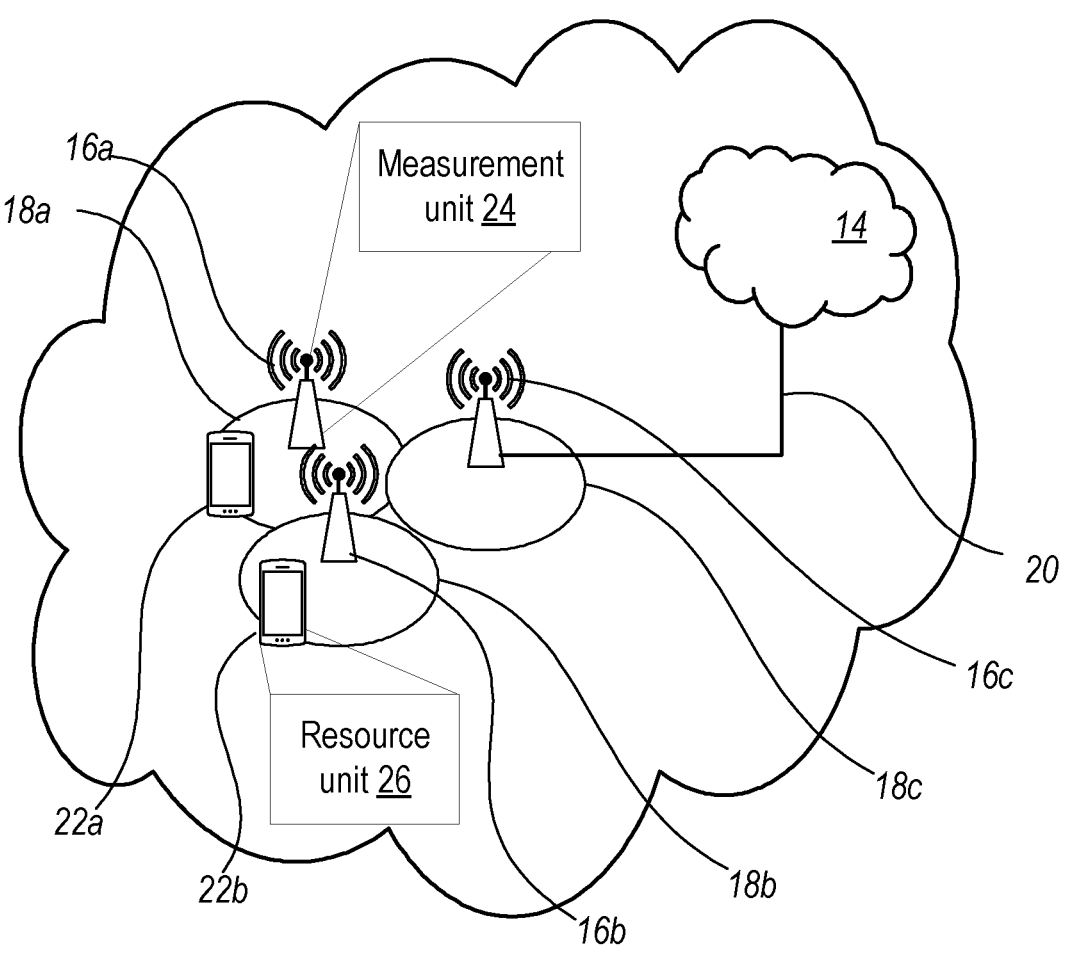

Some embodiments of the present disclosure describe an arrangement to reduce complexity of the uplink (UL) receiver by identifying channels with good (e.g., high quality) communication properties. Some embodiments may allow handling of contradictory requirements of processing many WDs on shared resources and/or being able to address WDs having a high delay spread.

Before describing in detail example embodiments, it is noted that the embodiments reside primarily in combinations of apparatus components and processing steps related to multiple user multiple-input multiple-output (MU-MIMO) e.g., complexity reduction in a receiver. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB), donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB, relay node, access point, radio access point, Remote Radio Unit (RRU) Remote Radio Head (RRH).

In some embodiments, allocating may be performed by a network node and may include scheduling and/or signaling scheduling information, via e.g., downlink control information (DCI) and/or radio resource control (RRC) signaling, to the scheduled one or more WDs.

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter and the receiver is the WD. For the UL communication, the transmitter is the WD and the receiver is the network node.

The term "radio measurement" used herein may refer to any measurement performed on radio signals. Radio measurements can be absolute or relative. Radio measurement may be called as signal level which may be signal quality and/or signal strength. Radio measurements can be unidirectional (e.g., DL or UL) or bidirectional (e.g., Round Trip Time (RTT), Receive-Transmit (Rx-Tx), etc.). Some examples of radio measurements include: timing measurements (e.g., Time of Arrival (TOA), timing advance, RTT, Reference Signal Time Difference (RSTD), Rx-Tx, propagation delay, etc.), angle measurements (e.g., angle of arrival), power-based measurements (e.g., received signal power, Reference Signals Received Power (RSRP), received signal quality, Reference Signals Received Quality (RSRQ), Signal-to-interference-plus-noise Ratio (SINR), Signal Noise Ratio (SNR), interference power, total interference plus noise, Received Signal Strength Indicator (RSSI), noise power, etc.), cell detection or cell identification, radio link monitoring (RLM), system information (SI) reading, etc.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages may be comprised therein, which may be transmitted on different carriers. Signaling associated to a channel may be transmitted such that the signaling is interpreted by the transmitter and/or receiver to belong to that channel. Such signaling may generally comply with transmission parameters and/or format/s for the channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

A channel may generally be a logical or physical channel. A channel may comprise and/or be arranged on one or more carriers, in particular a plurality of subcarriers. A channel may be defined for a specific communication direction, or for two complementary communication directions (e.g., UL and DL, or sidelink in two directions), in which case it may be considered to have at least two component channels, one for each direction. Examples of channels comprise a physical uplink shared channel (PUSCH), physical uplink control channel (PUCCH), physical downlink shared channel (PDSCH) and physical downlink control channel (PDSCH).

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions.

Note that although terminology from one particular wireless system, such as, for example, 3$^{rd}$ Generation Partnership Project (3GPP) Long Term Evolution (LTE) and/or New Radio (NR) (NR is also known as 5G), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments include arrangements that may provide MU-MIMO complexity reduction for receivers. Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include a measurement unit 24 which is configured to determine a frequency dispersion of a channel for the WD; and based at least in part on the determination of the frequency dispersion, determine at least one frequency spacing for at least one weight associated with the channel.

A wireless device 22 is configured to include a resource unit 26 which is configured to transmit a signal to the network node; and receive an allocation of at least one time-frequency resource based at least in part on a determination of a frequency dispersion on the transmitted signal, the at least one time-frequency resource being shared between the WD and at least one other WD.

Example implementations, in accordance with an embodiment, of the WD 22 and network node 16 discussed in the preceding paragraphs will now be described with reference to FIG. 2.

The communication system 10 further includes a network node 16 provided in a communication system 10 and including hardware 27 enabling it to communicate with the WD 22. The hardware 27 may include a communication interface 28 for setting up and maintaining a wired or wireless connection with an interface of a different communication device of the communication system 10, as well as a radio interface 30 for setting up and maintaining at least a wireless connection 32 with a WD 22 located in a coverage area 18 served by the network node 16. The radio interface 30 may be formed as or may include, for example, one or more RF transmitters, one or more RF receivers, and/or one or more RF transceivers and/or one or more antennas.

In the embodiment shown, the hardware 27 of the network node 16 further includes processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 36 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 40 stored internally in, for example, memory 38, or stored in external memory (e.g., database, storage array, network storage device, etc.) accessible by the network node 16 via an external connection. The software 40 may be executable by the processing circuitry 34. The processing circuitry 34 may be configured to control any of the methods and/or processes described herein and/or to cause such methods, and/or processes to be performed, e.g., by network node 16. Processor 36 corresponds to one or more processors 36 for performing network node 16 functions described herein. The memory 38 is configured to store data, programmatic software code and/or other information described herein. In some embodiments, the software 40 may include instructions that, when executed by the processor 36 and/or processing circuitry 34, causes the processor 36 and/or processing circuitry 34 to perform the processes described herein with respect to network node 16. For example, processing circuitry 34 of the network node 16 may include measurement unit 24 configured to perform network node methods discussed herein, such as the methods discussed with reference to FIG. 4 well as other figures.

The communication system 10 further includes the WD 22 already referred to. The WD 22 may have hardware 42 that may include a radio interface 44 configured to set up and maintain a wireless connection 32 with a network node 16 serving a coverage area 18 in which the WD 22 is currently located. The radio interface 44 may be formed as or may include, for example, one or more RF transmitters, one or more RF receivers, and/or one or more RF transceivers and/or one or more antennas.

The hardware 42 of the WD 22 further includes processing circuitry 46. The processing circuitry 46 may include a processor 48 and memory 50. In particular, in addition to or instead of a processor, such as a central processing unit, and memory, the processing circuitry 46 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 48 may be configured to access (e.g., write to and/or read from) memory 50, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 52, which is stored in, for example, memory 50 at the WD 22, or stored in external memory (e.g., database, storage array, network storage device, etc.) accessible by the WD 22. The software 52 may be executable by the processing circuitry 46. The software 52 may include a client application 54. The client application 54 may be operable to provide a service to a human or non-human user via the WD 22. The client application 54 may interact with the user to generate the user data that it provides.

The processing circuitry 46 may be configured to control any of the methods and/or processes described herein and/or to cause such methods, and/or processes to be performed, e.g., by WD 22. The processor 48 corresponds to one or more processors 48 for performing WD 22 functions described herein. The WD 22 includes memory 50 that is configured to store data, programmatic software code and/or other information described herein. In some embodiments, the software 52 and/or the client application 54 may include instructions that, when executed by the processor 48 and/or processing circuitry 46, causes the processor 48 and/or processing circuitry 46 to perform the processes described herein with respect to WD 22. For example, the processing circuitry 46 of the wireless device 22 may include resource unit 26 configured to perform WD methods discussed herein, such as the methods discussed with reference to FIG. 5 as well as other figures.

Figure 2:
FIG. 2 is a block diagram of a network node in communication with a wireless device over an at least partially wireless connection according to some embodiments of the present disclosure.

In some embodiments, the inner workings of the network node 16 and WD 22, may be as shown in FIG. 2 and independently, the surrounding network topology may be that of FIG. 1.

Although FIGS. 1 and 2 show various "units" such as measurement unit 24 and resource unit 26 as being within a processor, it is contemplated that these units may be implemented such that a portion of the unit is stored in a corresponding memory within the processing circuitry. In other words, the units may be implemented in hardware or in a combination of hardware and software within the processing circuitry.

Figure 3:
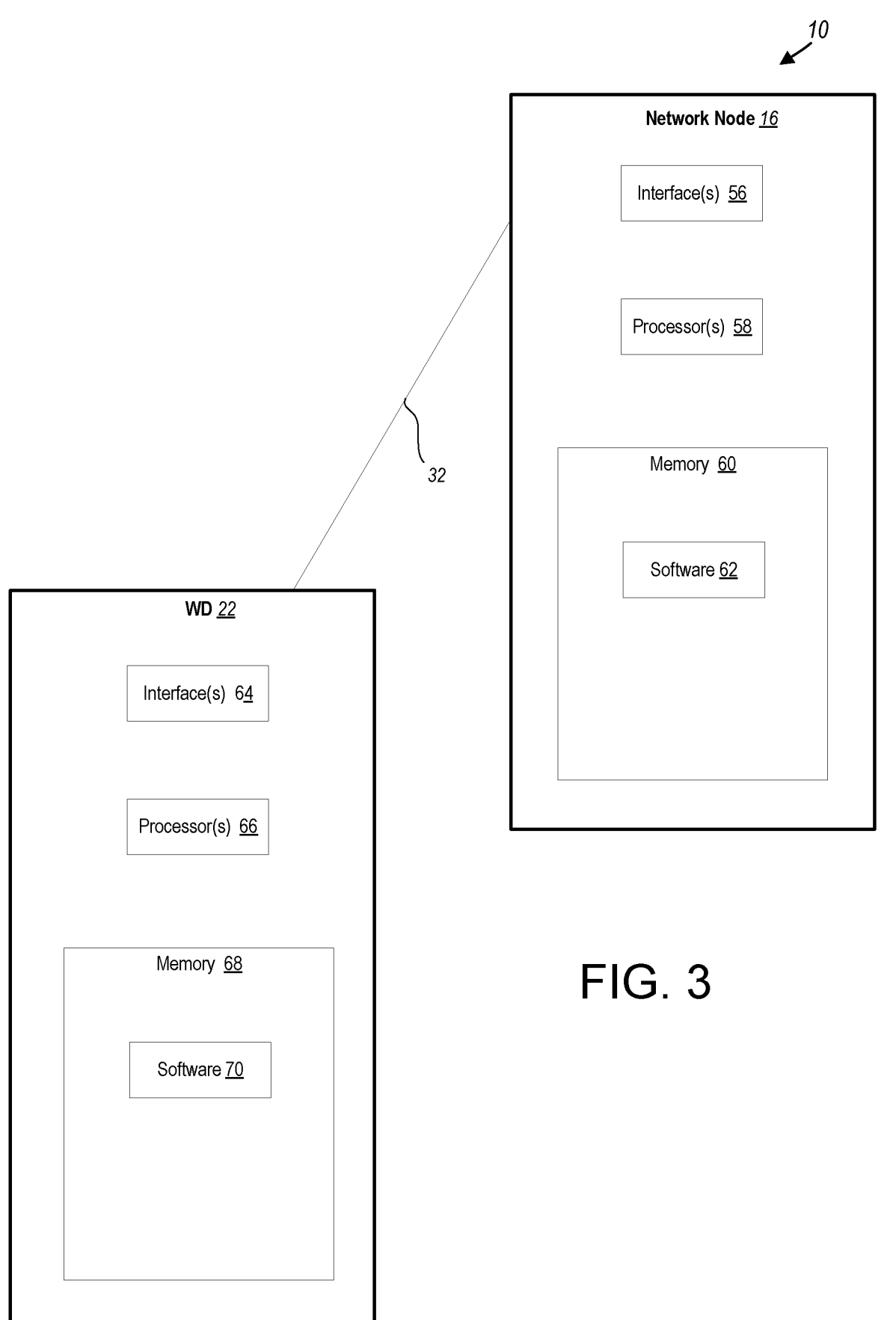
FIG. 3 is a block diagram illustrating yet another embodiment of a network node in communication with a wireless device according to some embodiments of the present disclosure.

FIG. 3 illustrates yet another embodiment of a network node 16, which may implement some embodiments of the network node methods described herein. The network node 16 includes one or more interfaces 56, one or more processors 58, and a memory 60. The memory 60 contains instructions, such as in the software 62, executable by the one or more processors 58, such that the network node 16, is operative to perform any of the network node methods described herein, such as, to determine a frequency dispersion of a channel for the WD 22. The network node 16 may be further operative to, based at least in part on the determination of the frequency dispersion, determine at least one frequency spacing for at least one weight associated with the channel.

FIG. 3 illustrates another embodiment of a WD 22, which may implement some embodiments of the WD methods described herein. The WD 22 includes one or more interfaces 64, one or more processors 66, and a memory 68. The memory 68 contains instructions, such as in the software 70, executable by the one or more processors 66, such that the WD 22, is operative to perform any of the WD methods described herein, such as, to transmit a signal to the network node 16. The WD 22 may be further operative to receive an allocation of at least one time-frequency resource based at least in part on a measurement of a frequency dispersion on the transmitted signal, the at least one time-frequency resource being shared between the WD 22 and at least one other WD 22.

Figure 4:
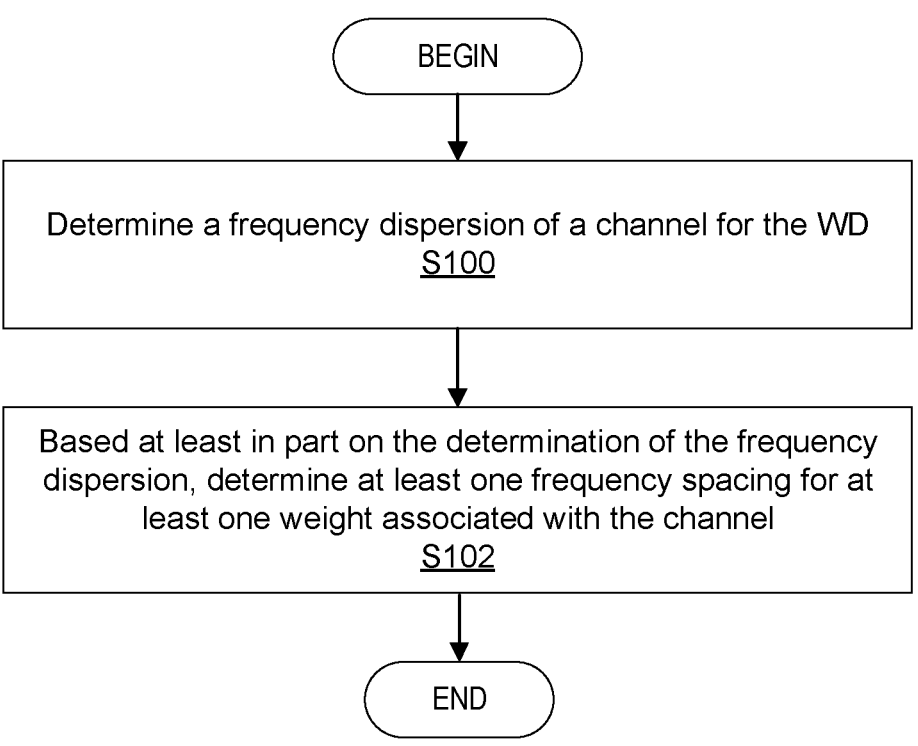
FIG. 4 is a flowchart of an example process in a network node for according to some embodiments of the present disclosure.

FIG. 4 is a flowchart of an example process in a network node 16 according to some embodiments of the present disclosure. One or more Blocks and/or functions and/or methods performed by the network node 16 may be performed by one or more elements of network node 16 such as by measurement unit 24 in processing circuitry 34, memory 38, processor 36, communication interface 28, radio interface 30, software 62, etc. according to the example method. The example method includes determining (Block S100), such as via measurement unit 24, processing circuitry 34, memory 38, processor 36, communication interface 28, software 62, and/or radio interface 30, a frequency dispersion of a channel for the WD 22. The method includes based at least in part on the determination of the frequency dispersion, determining (Block S102), such as via measurement unit 24, processing circuitry 34, memory 38, software 62, processor 36, communication interface 28 and/or radio interface 30, at least one frequency spacing for at least one weight associated with the channel.

In some embodiments, the method further includes allocating, such as via measurement unit 24, processing circuitry 34, processor 36, memory 38, software 62, communication interface 28 and/or radio interface 30, at least one shared time-frequency resource to the WD 22 and at least one other WD 22 based at least in part on at least one of the determination of the frequency dispersion and the determined at least one frequency spacing. In some embodiments, the shared time-frequency resource is at least one of: an uplink resource; and a downlink resource. In some embodiments, the determining the frequency dispersion further includes determining, such as via measurement unit 24, processing circuitry 34, processor 36, communication interface 28, software 62, and/or radio interface 30, a channel estimate for the WD 22 at each subcarrier within a frequency region.

In some embodiments, subcarriers within the frequency region are represented by indices and the indices are integer values. In some embodiments, the frequency region is represented by an integer corresponding to a physical resource block index. In some embodiments, the determining the frequency dispersion further includes determining a mean frequency dispersion value for a plurality of frequency dispersion measurements, the plurality of frequency dispersion measurements taken over at least one physical resource block and for one of at least one antenna stream and at least one beam stream.

In some embodiments, the one of the at least one antenna stream and the at least one beam stream used to determine the mean frequency dispersion value is selected based on whether the corresponding stream has a power that at least meets a predetermined threshold power value. In some embodiments, a number of the at least one physical resource block used to determine the mean frequency dispersion value is a predetermined number. In some embodiments, the method further includes determining a threshold for the determination of the frequency dispersion; and using the determined threshold to determine a number of other WDs 22 to co-schedule with the WD 22 on a same time-frequency resource.

In some embodiments, the method further includes applying the at least one weight to a time-frequency resource, the time-frequency resource being shared by the WD 22 and at least one other spatially separate WD 22 in multiple user multiple-input multiple-output, MU-MIMO communication. In some embodiments, the method further includes transmitting an indication of a timing adjustment value to the WD 22; and one of transmitting and receiving a signal on a shared time-frequency resource based at least in part on the timing adjustment value. In some embodiments, the method further includes receiving a signal from the WD 22; and wherein the determining the frequency dispersion of the channel for the WD 22 includes performing a measurement of the frequency dispersion on the received signal.

Figure 5:
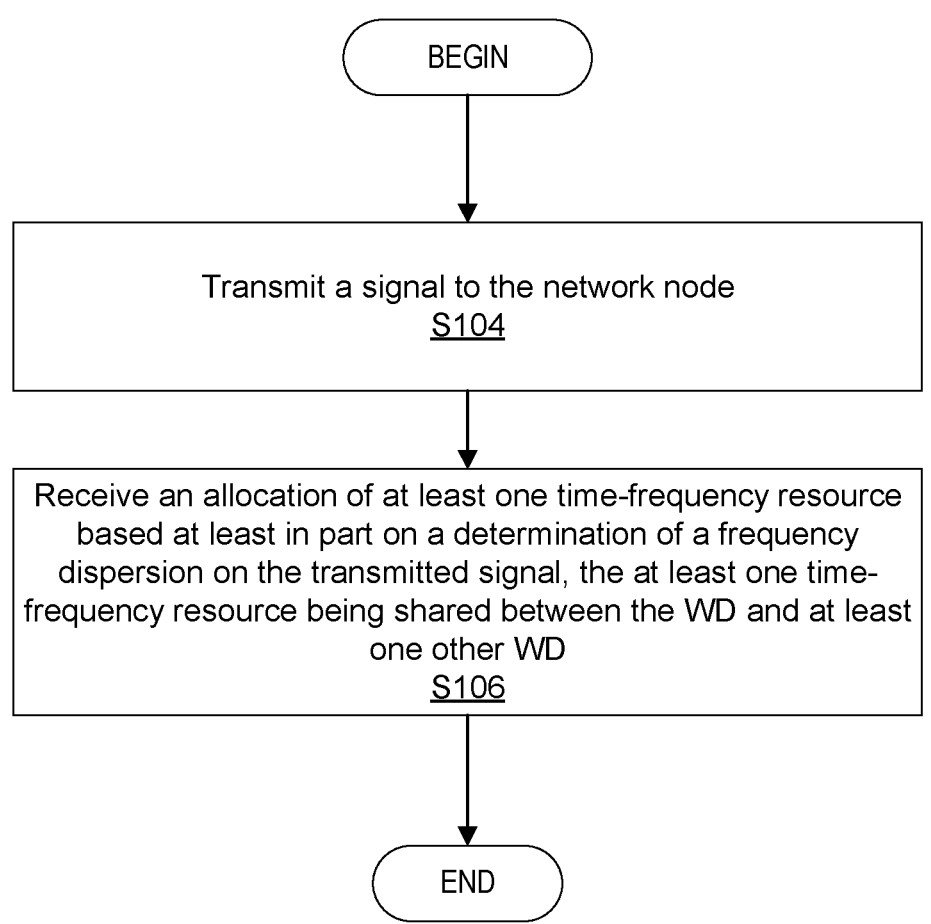
FIG. 5 is a flowchart of an example process in a wireless device for according to some embodiments of the present disclosure.

FIG. 5 is a flowchart of an example process in a wireless device 22 according to some embodiments of the present disclosure. One or more Blocks and/or functions and/or methods performed by WD 22 may be performed by one or more elements of WD 22 such as by resource unit 26 in processing circuitry 46, processor 48, radio interface 44, etc. The example method includes transmitting (Block S104), such as via resource unit 26, processing circuitry 46, processor 48, memory 50, software 70 and/or radio interface 44, a signal to the network node 16. The method includes receiving (Block S106), such as via resource unit 26, processing circuitry 46, processor 48, software 70 and/or radio interface 44, an allocation of at least one time-frequency resource based at least in part on a determination of a frequency dispersion on the transmitted signal, the at least one time-frequency resource being shared between the WD 22 and at least one other WD 22.

In some embodiments, the shared time-frequency resource is at least one of: an uplink resource; and a downlink resource. In some embodiments, a number of other WDs 22 sharing the at least one time-frequency resource with the WD 22 is based at least in part on the determination of the frequency dispersion. In some embodiments, the method further includes one of transmitting and receiving, such as via resource unit 26, processing circuitry 46, processor 48, memory 50, software 70 and/or radio interface 44, signalling on the allocated at least one time-frequency resource. At least one weight being applied to the signalling and the at least one weight being based at least in part on the determination of the frequency dispersion. In some embodiments, the method includes receiving, such as via resource unit 26, processing circuitry 46, processor 48, memory 50, software 70 and/or radio interface 44, an indication of a timing adjustment value from the network node; and one of transmitting and receiving, such as via resource unit 26, processing circuitry 46, processor 48, memory 50, software 70 and/or radio interface 44, a signal on the allocated at least one time-frequency resource based at least in part on the timing adjustment value.

Having described the general process flow of arrangements of the disclosure and having provided examples of hardware and software arrangements for implementing the processes and functions of the disclosure, the sections below provide details and examples of arrangements for e.g., MU-MIMO complexity reduction in a receiver, which may be implemented by the network node 16 and/or wireless device 22.

In some embodiments, to separate WDs 22 that are using the same resources, the receiver/receiver antenna (e.g., network node 16 and/or radio interface 30) may apply one or more specific weights to each WD 22. For instance, the weights may be computed at each subcarrier, or only once per resource block (=12 subcarriers) or at another pace or rate or period. In some embodiments, to cope with the inherent frequency dispersion of the channel, weights may be computed (e.g., by network node 16, processing circuitry 34 and/or processor 36) close enough together in the frequency domain. Stated another way, if the channels are dispersive, weights may be computed at a higher pace (i.e., frequency distance between weight samples is smaller, as compared to a slower pace where the frequency distance between weight samples would be greater). Generally, the more the channel is spread in the delay domain, the more frequency dispersive it is.

Some embodiments of the present disclosure provide for a measurement (e.g., by the network node 16, the radio interface 30, the processing circuitry 34 and/or the processor 36) of the channel frequency dispersion, allowing to adapt the frequency spacing of the computed weights.

Typically, to reduce complexity, only WDs 22 with low frequency dispersion may be co-scheduled on the same resources; because then, since the WDs' 22 channels may be constant during a large frequency region, fewer weights may be computed. This may also allow a smooth adaptation of the weights' frequency spacing. Generally, the more dispersive, the smaller number of WDs 22 are scheduled on the same resources.

Some embodiments propose using the following example formula:

$$\text{mean over } p \text{ and branches} \left[ \frac{\left| \sum_{k=1:12} h_p(k) \right|}{\sum_{k=1:12} |h_p(k)|} \right],$$

where p is the index of a frequency region of a same size; typically p would be the physical resource block (PRB) index, and $h_p(k)$ is the channel estimate of a certain WD 22 at subcarrier k in region p (k may be considered a subcarrier index). This measure may be between 0 and 1, where 1 may mean that the channel is perfectly constant during each frequency region. The branches may be the antenna streams, or the beam streams obtained by spatially transforming the antenna streams. Note that, in some embodiments, to further reduce the complexity of computing this measurement, the average may be reduced to only take into account a few frequency regions (PRBs), e.g., 10, and/or only the antenna streams or beam streams with the highest powers (e.g., a threshold can be defined to select beams or antennas with a highest total energy). For example, a number/amount of PRBs used to determine the average or mean frequency dispersion value may be a predetermined number, e.g., 10, and/or which antenna streams or antenna beams are used to determine or calculate the average or mean frequency dispersion value may be those streams that have a power that at least meet (equal to or greater than) a predetermined threshold power.

In an alternative embodiment, the measure of the frequency dispersion may include the channel length in time domain. This may provide a good measurement but may be bit less accurate in the sense that even with some delay spread, the channel could be relatively flat in a particular frequency region.

In some embodiments, the measurement may be used by the network node 16 to detect WDs 22 with a high delay spread. In some embodiments, the network node 16 may accordingly avoid scheduling such WDs 22 with the high delay spread. In some embodiments, "high delay spread" may be, for example, a delay spread above 500 nanoseconds (ns) or some other values may be used in other embodiments. In some embodiments, the network node's 16 co-scheduling of the WDs 22 may include co-scheduling the WDs in the UL.

In some embodiments, one or more thresholds may be defined on the measurement to determine with how many other WDs 22 this particular WD 22 could be co-scheduled with on the same resources. As one non-limiting example, if a WD 22 has a measurement below X % e.g., 70% of a predetermined threshold measurement, then the WD 22 would not be co-scheduled. Other threshold values may be used in other embodiments.

In some embodiments, the UL receiver (e.g., radio interface 30) of a network node 16 may report this measurement to the scheduler of the network node 16, which, in turn, may only co-schedule WDs 22 that meet, e.g., the above-mentioned thresholds.

In some embodiments, depending on the distance between the transmitter (e.g., WD 22) to the receiver (e.g., network node), the energy peak of the received signal may not occur at the start time of a reception frame of the receiver. The cyclic prefix (CP) may ensure that the whole signal is received, but the symbols may be rotating in the frequency domain. Thus, to avoid detecting time-misaligned channels with dispersive channels, some embodiments may be combined with a time-alignment procedure. The time-alignment procedure may be performed by the network node 16. For example, in some embodiments, the network node 16 may calculate a timing adjustment value (i.e., an indication of a time delay/offset for the WD 22 to transmit an UL signal relative to at least a start of an uplink frame or subframe, e.g., timing-advance command, or other timing offset indicator) for each WD 22 sharing a same resource and may transmit the timing adjustment value to the corresponding WD 22. In one embodiment, the network node 16 may measure a time difference (e.g., between when the network node 16 receives an UL signal and a start of a frame) and send a timing adjust value, such as a TA (timing-advance) command or other timing offset indicator to the WD 22, so that the WD 22 can adjust its UL transmission time.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

Abbreviations Explanations

A-MPR Additional Maximum Power Reduction
CA Carrier Aggregation
ePHR Extended Power Headroom Report
IMEI International Mobile Equipment Identity
IMEISV IMEI Software Version
MCS Modulation and Coding Scheme
MME Mobility Management Entity
MPR Maximum Power Reduction
PHR Power Headroom Report
P-MPR Power Management Maximum Power Reduction
RB Resource Block
TAC Type Allocation Code
UE Use Equipment
UL Uplink It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method implemented in a network node for multi-user multiple input multiple output (MU-MIMO), communications, the method comprising:
   determining a measurement of frequency dispersion of a channel for a wireless device (WD);
   determining at least one frequency spacing based on computing one or more weights associated with the channel for separating the WD and at least one other WD which share a same time-frequency resource, the one or more weights being computed at a higher rate in a frequency domain if the channel is more frequency dispersive such that the frequency distance between weight samples is smaller as compared to the one or more weights being computed at a slower rate in the frequency domain if the channel is less frequency dispersive such that the frequency distance between weight samples is greater;
   allocating at least one shared time-frequency resource to the WD and the at least one other WD based in part on at least one of the frequency dispersion measurement and the at least one frequency spacing; and
   determining a number of other spatially separate wireless devices, WDs, to co-schedule with the WD on the shared time-frequency resource based at least in part on whether the determined frequency dispersion measurement is less than a defined threshold.

2. The method of claim 1, wherein the determining the frequency dispersion comprises:
   determining a channel estimate for the WD at each subcarrier within a frequency region.

3. The method of claim 2, wherein subcarriers within the frequency region are represented by indices and the indices are integer values.

4. The method of claim 2, wherein the frequency region is represented by an integer corresponding to a physical resource block index.

5. The method of claim 1, wherein the determining the frequency dispersion comprises:
   determining a mean frequency dispersion value for a plurality of frequency dispersion measurements, the plurality of frequency dispersion measurements taken over at least one physical resource block and over at least one antenna stream and at least one beam stream.

6. The method of claim 5, wherein the one of the at least one antenna stream and the at least one beam stream used to determine the mean frequency dispersion value is selected based on whether the corresponding stream has a power that at least meets a predetermined threshold power value.

7. The method of claim 5, wherein a number of the at least one physical resource block used to determine the mean frequency dispersion value is a predetermined number.

8. A network node for multi-user multiple input multiple output (MU-MIMO) communications, the network node comprising:
   processing circuitry, the processing circuitry configured to cause the network node to:
   determine a measurement of frequency dispersion of a channel for a wireless device (WD);
   determine at least one frequency spacing based on computing one or more weights associated with the channel for separating the WD and at least one other WD which share a same time-frequency resource, the one or more weights being computed at a higher rate in a frequency domain if the channel is more frequency dispersive such that the frequency distance between weight samples is smaller as compared to the one or more weights being computed at a slower rate in the frequency domain if the channel is less frequency dispersive such that the frequency distance between weight samples is greater;
   allocating at least one shared time-frequency resource to the WD and the at least one other WD based in part on at least one of the frequency dispersion measurement and the at least one frequency spacing; and
   determine a number of other spatially separate wireless devices, WDs, to co-schedule with the WD on the shared time-frequency resource based at least in part on whether the determined frequency dispersion measurement is less than a defined threshold.

9. The network node of claim 8, wherein the processing circuitry is configured to determine the frequency dispersion by being configured to cause the network node to:

determine a mean frequency dispersion value for a plurality of frequency dispersion measurements, the plurality of frequency dispersion measurements taken over at least one physical resource block and for one of at least one antenna stream and at least one beam stream.

10. The network node of claim 9, wherein the one of the at least one antenna stream and the at least one beam stream used to determine the mean frequency dispersion value is selected based on whether the corresponding stream has a power that at least meets a predetermined threshold power value.

11. The network node of claim 10, wherein a number of the at least one physical resource block used to determine the mean frequency dispersion value is a predetermined number.

* * * * *